(12) United States Patent
Hsu

(10) Patent No.: US 8,854,508 B2
(45) Date of Patent: Oct. 7, 2014

(54) ADAPTIVE IMAGE PROCESSING METHOD AND RELATED DEVICE

(75) Inventor: Wei Hsu, Taoyuan County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 303 days.

(21) Appl. No.: 13/517,612

(22) Filed: Jun. 14, 2012

(65) Prior Publication Data
US 2013/0208152 A1 Aug. 15, 2013

(30) Foreign Application Priority Data
Feb. 10, 2012 (TW) .............................. 101104318 A

(51) Int. Cl.
*H04N 9/64* (2006.01)
*H04N 5/217* (2011.01)

(52) U.S. Cl.
USPC .......................... 348/246; 348/241; 348/247

(58) Field of Classification Search
USPC ......................................................... 348/246
See application file for complete search history.

(56) References Cited

U.S. PATENT DOCUMENTS

| | | | |
|---|---|---|---|
| 7,313,288 B2 | 12/2007 | Dierickx | |
| 2003/0063203 A1* | 4/2003 | Ohno | ............................ 348/247 |
| 2004/0051798 A1* | 3/2004 | Kakarala et al. | ............... 348/246 |
| 2005/0276510 A1* | 12/2005 | Bosco et al. | .................... 382/275 |
| 2008/0240559 A1* | 10/2008 | Malvar | ........................... 348/246 |
| 2009/0175553 A1* | 7/2009 | Utsugi | ............................ 382/254 |
| 2010/0259650 A1* | 10/2010 | Sasaki | ............................ 348/241 |
| 2012/0039545 A1* | 2/2012 | Chen | .............................. 382/275 |
| 2013/0135501 A1* | 5/2013 | Irinouchi et al. | ............... 348/246 |

FOREIGN PATENT DOCUMENTS

| | | |
|---|---|---|
| TW | I228237 | 2/2005 |
| TW | I327023 | 7/2010 |
| TW | I328962 | 8/2010 |

\* cited by examiner

*Primary Examiner* — Sinh Tran
*Assistant Examiner* — Jason Flohre
(74) *Attorney, Agent, or Firm* — Winston Hsu; Scott Margo

(57) ABSTRACT

An adaptive image processing method includes: defining a pixel zone involving a target pixel according to a color corresponding to the target pixel; selecting a plurality of adjacent pixels from the pixel zone, wherein the adjacent pixels and the target pixel correspond to the same color; acquiring a defect pixel threshold value by calculating a product of a sum of absolute differences between each pixel of the plurality of adjacent pixels and a defected pixel compensation ratio; acquiring an adjacent difference value by calculating a sum of absolute differences between the target pixel and each pixel of the plurality of adjacent pixels; and determining whether the target pixel is a defect pixel by comparing the defect pixel threshold value with the adjacent difference value.

33 Claims, 9 Drawing Sheets

ADAPTIVE IMAGE PROCESSING METHOD AND RELATED DEVICE

BACKGROUND OF THE INVENTION

1. Field of the Invention

The present invention relates to an adaptive image processing method and related device, and more particularly, to an adaptive image processing method capable of detecting and compensating defect pixels and a related device.

2. Description of the Prior Art

Image sensing elements such as CMOS image sensors (CIS) and charge-coupled devices (CCD) have been widely applied in various consumer electronic products such as digital cameras, personal digital assistants (PDAs) and smart mobile communication devices. Part of the image sensing pixel units of the image sensing element may work abnormally due to process variations, meaning the pixel values corresponding to the abnormal image sensing pixel units will be erroneous. The abnormal image sensing pixel unit is called a defect pixel. Defect pixels may also randomly exist in the image due to environmental factors present when capturing the image, such as temperature, brightness, and photosensitivity.

After the image sensing element captures the image, the image sensing element must use an image processing device for compensating the pixel values of the defect pixels, so that the pixel values of the defect pixels will not decrease the image quality when image enhancement procedures such as image sharpness are performed. In the prior art, the image processing device can acquire positions of the defect pixels through defect pixel information and then compensate the defect pixels by calculating average pixel values of adjacent pixels for each defect pixel. The defect pixel information is acquired by testing when the consumer electronic product is manufactured, and is stored in the memory of the consumer electronic product. As a result, the image processing device has to read the defect pixel information from the memory each time the image sensing element captures the image, to compensate each defect pixel.

Since the defect pixel information is acquired when the consumer electronic products is manufactured, the defect pixels recorded in the defect pixel information do not include the above-mentioned random defect pixels, and these random defect pixels therefore cannot be compensated. In addition, the defect pixel information needs to be stored in the memory. If the image processing device can adaptively and accurately detect the defect pixels, all the defect pixels in the image can be compensated and the memory utilized for storing the defect pixel information will no longer be needed.

SUMMARY OF THE INVENTION

The present invention provides an adaptive image processing method capable of accurately detecting defect pixels in the image and related device.

The present invention discloses an adaptive image processing method. The adaptive image processing method comprises: defining a pixel zone involving a target pixel according to a color corresponding to the target pixel; selecting a plurality of adjacent pixels from the pixel zone, wherein the adjacent pixels and the target pixel correspond to the same color; acquiring a defect pixel threshold value by calculating a product of a sum of absolute differences between each pixel of the plurality of adjacent pixels and a defect pixel compensation ratio; acquiring an adjacent difference value by calculating a sum of absolute differences between the target pixel and each pixel of the plurality of adjacent pixels; and determining whether the target pixel is a defect pixel by comparing the defect pixel threshold value with the adjacent difference value.

The present invention further discloses a computer readable recording media. The computer readable recording media comprises a plurality of instructions for allowing a processor to execute the above adaptive image processing method.

The present invention further discloses a computer program product. The computer program product comprises a plurality of instructions for allowing a processor to execute the above adaptive image processing method.

The present invention further discloses an adaptive image processing device, for processing an image which comprises a plurality of pixels, each pixel of the plurality of pixels corresponding to a color. The adaptive image processing device comprises: a zone detecting module, for defining a pixel zone involving a target pixel according to a color corresponding to the target cell; a calculation module, for acquiring a defect pixel threshold value by calculating a product of a sum of absolute differences between each pixel of a plurality of adjacent pixels and a defect pixel compensation ratio, and acquiring an adjacent difference value by calculating a sum of absolute differences between the target pixel and each pixel of the plurality of adjacent pixels; and a determination module, for determining whether the target pixel is a defect pixel according to the defect pixel threshold value and the adjacent difference value; wherein the adjacent pixels and the target pixel correspond to the same color.

The present invention further discloses an image processing system. The image processing system comprises an image capturing device, comprising an image sensor for capturing an image which comprises a plurality of pixels, each pixel of the plurality of pixels corresponding to a color; and an image processing device, for receiving the image and executing at least one image procedure which is performed by the above adaptive image processing device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
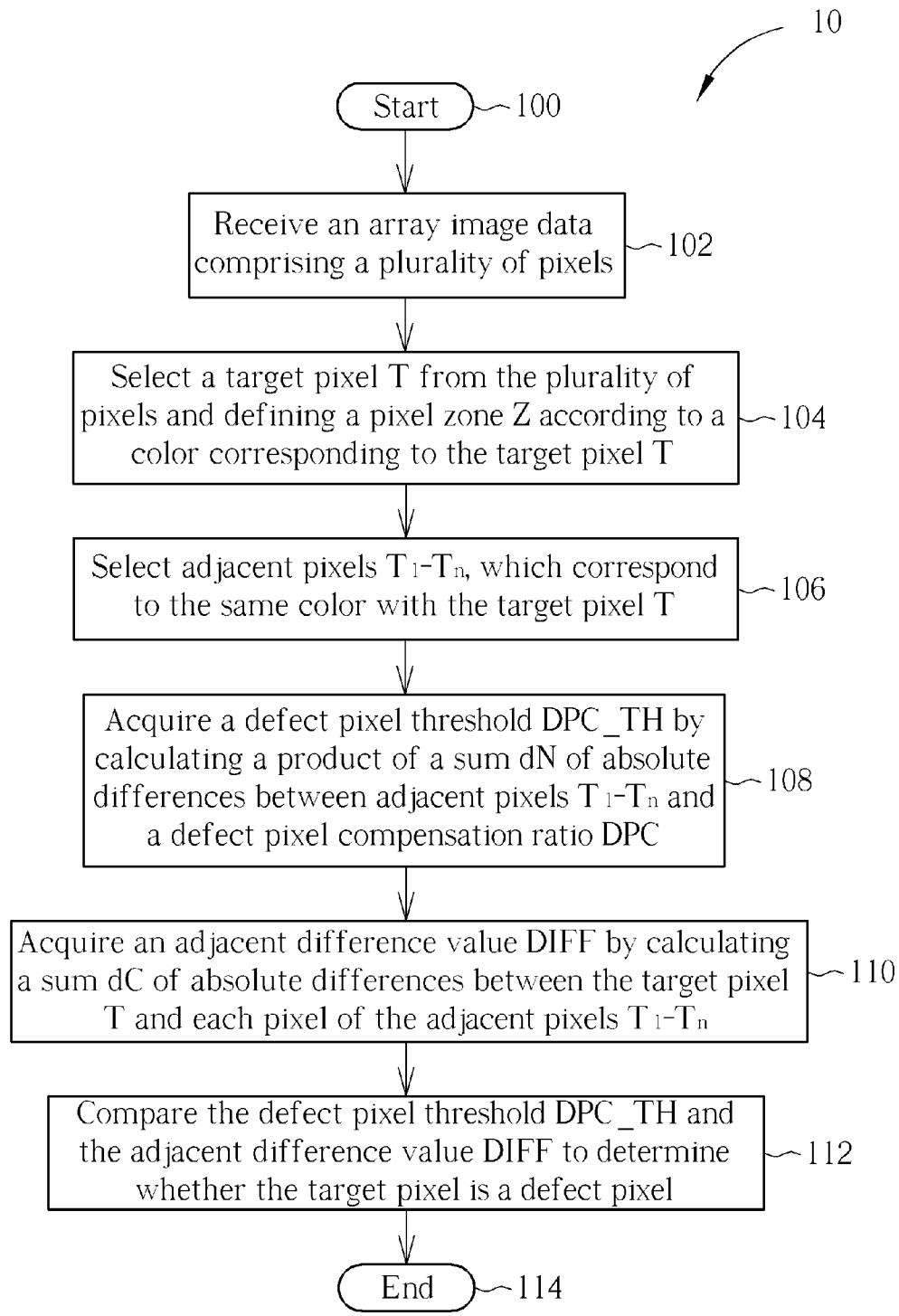
FIG. 1 is a schematic diagram of an adaptive image processing method according to an embodiment of the present invention.

Please refer to FIG. 1, which is a schematic diagram of an adaptive image processing method 10 according to an embodiment of the present invention. As shown in FIG. 1, the adaptive image processing method 10 comprises:

Step 100: Start;
Step 102: Receive an array image data comprising a plurality of pixels;
Step 104: Select a target pixel T from the plurality of pixels and defining a pixel zone Z according to a color corresponding to the target pixel T;
Step 106: Select adjacent pixels $T_1$-$T_n$, which correspond to the same color with the target pixel T;
Step 108: Acquire a defect pixel threshold value DPC_TH by calculating a product of a sum dN of absolute differences between adjacent pixels $T_1$-$T_n$ and a defect pixel compensation ratio DPC;
Step 110: Acquire an adjacent difference value DIFF by calculating a sum dC of absolute differences between the target pixel T and each pixel of the adjacent pixels $T_1$-$T_n$;
Step 112: Compare the defect pixel threshold value DPC_TH with the adjacent difference value DIFF to determine whether the target pixel is a defect pixel;
Step 114: End.

Detailed description of the steps of the adaptive image processing method 10 is as follows. First, in the step 102, the array image data comprising the plurality of pixels is received. The array image data may be a Bayer image generated by a Bayer color filter array. In the step 104, a pixel is selected to be the target pixel T corresponding to red, blue or green. The pixel zone Z comprising the target pixel T is defined according to the color corresponding to the target pixel T. The shape of the pixel zone Z also depends on the color corresponding to the target pixel T. Preferably, the pixel zone Z is a square when the target pixel T corresponds to red or blue, and the pixel zone Z is a diamond when the target pixel T corresponds to green. In the step 106, pixels corresponding to the color corresponding to the target pixel T are selected to be adjacent pixels $T_1$-$T_n$. After selecting the adjacent pixels T1-Tn, the sum dN is acquired by calculating a sum of absolute differences between the adjacent pixels T1-Tn. Thus, the sum dN is expressed as:

$$dN = |T_1 - T_2| + |T_2 - T_3| + \ldots + |T_n - T_1| \quad (1)$$

After acquiring the sum dN, the defect pixel threshold value DPC_TH is acquired by calculating a product of the sum dN and the defected pixel compensation ratio DPC. The defect pixel threshold value DPC_TH is expressed as:

$$DPC\_TH = dN \times DPC \quad (2)$$

The defect pixel compensation ratio DPC relates to a photosensitivity measurement utilized when the array image data is capturing an image. When the photosensitivity increases, the defect pixel compensation ratio DPC decreases. For example, the defect pixel compensation ratio DPC is inverse proportional to the photosensitivity. In addition, the defect pixel threshold value DPC_TH is proportional to the sum dN. The defect pixel threshold value DPC_TH represents a relationship between the adjacent pixels $T_1$-$T_n$.

Next, in the step 110, the adjacent difference value DIFF is acquired by calculating the sum dC of the absolute differences between the target pixel T and each pixel of the adjacent pixel $T_1$-$T_n$. The sum dC (i.e. adjacent difference value DIFF) represents a relationship between the target pixel T and the adjacent pixels $T_1$-$T_n$. The adjacent difference value DIFF is expressed as:

$$DIFF = dC = |T - T_1| + |T - T_2| + \ldots + |T - T_n| \quad (3)$$

After the defect pixel threshold value DPC_TH and the adjacent difference value DIFF are acquired, whether the target pixel T is the defect pixel can be determined by comparing the defect pixel threshold value DPC_TH with the adjacent difference value DIFF. When the adjacent difference value DIFF is smaller than or equals the defect pixel threshold value DPC_TH, the relationship between the target pixel T and the adjacent pixels $T_1$-$T_n$ is similar to the relationship between the adjacent pixels $T_1$-$T_n$. The target pixel T is a normal pixel. When the adjacent difference value DIFF is greater than the defect pixel threshold value DPC_TH, the relationship between the target pixel T and the adjacent pixels $T_1$-$T_n$ is different from the relationship between the adjacent pixels $T_1$-$T_n$. The target pixel T is determined as the defect pixel.

According to the above, the adaptive image processing method 10 can determine whether the target pixel T is the defect pixel without using the defect pixel information. The adaptive image processing method 10 also can detect the defect pixels which are generated randomly. In addition, since the adaptive image processing method 10 uses the relationship between the target pixel T and the adjacent pixels $T_1$-$T_n$ and the relationship between the adjacent pixels $T_1$-$T_n$ as determination conditions, the adaptive image processing method 10 does not erroneously determine due to pixel values of the target pixel T. Furthermore, the defect pixel threshold value DPC_TH is derived from the sum dN and the defect pixel compensation ratio DPC can be determined according to the photosensitivity. The defect pixel threshold value DPC_TH can therefore be adjusted according to the photosensitivity. As a result, the adaptive image processing method 10 significantly improves accuracy of determination.

Figure 2A:
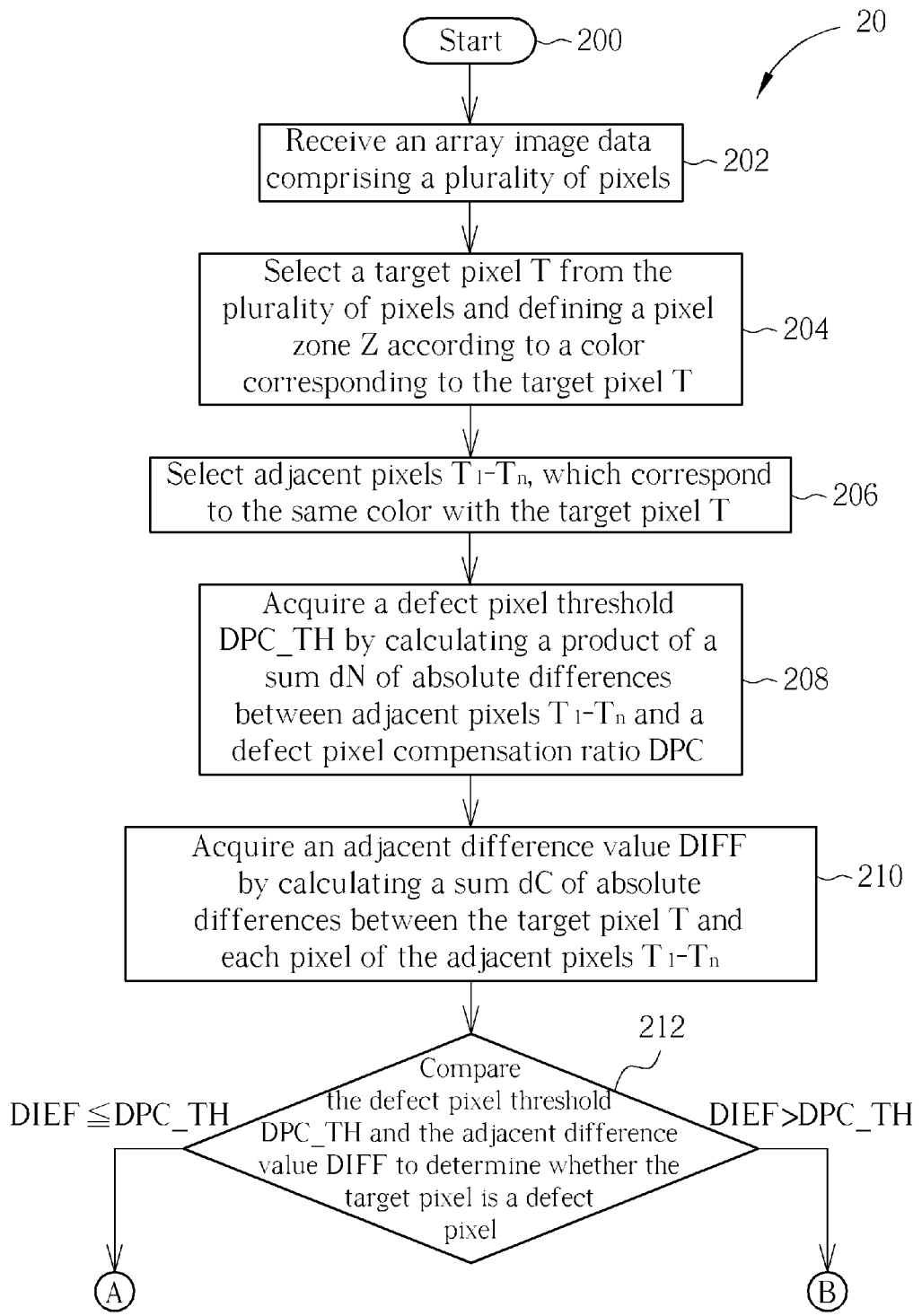
FIGS. 2A~2C are schematic diagrams of an implementation method of the adaptive image processing method shown in FIG. 1.
Figure 2B:
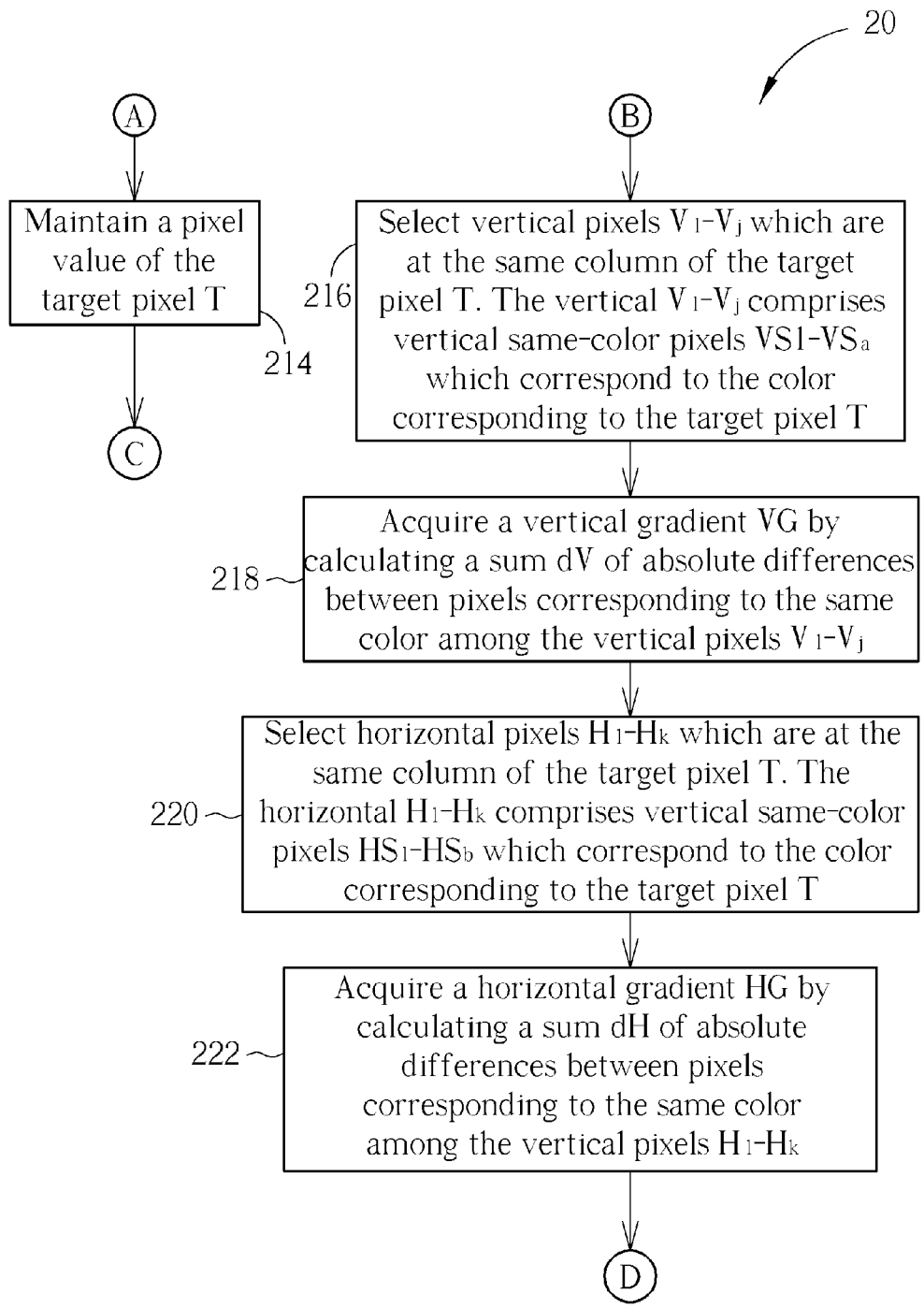
Figure 2C:
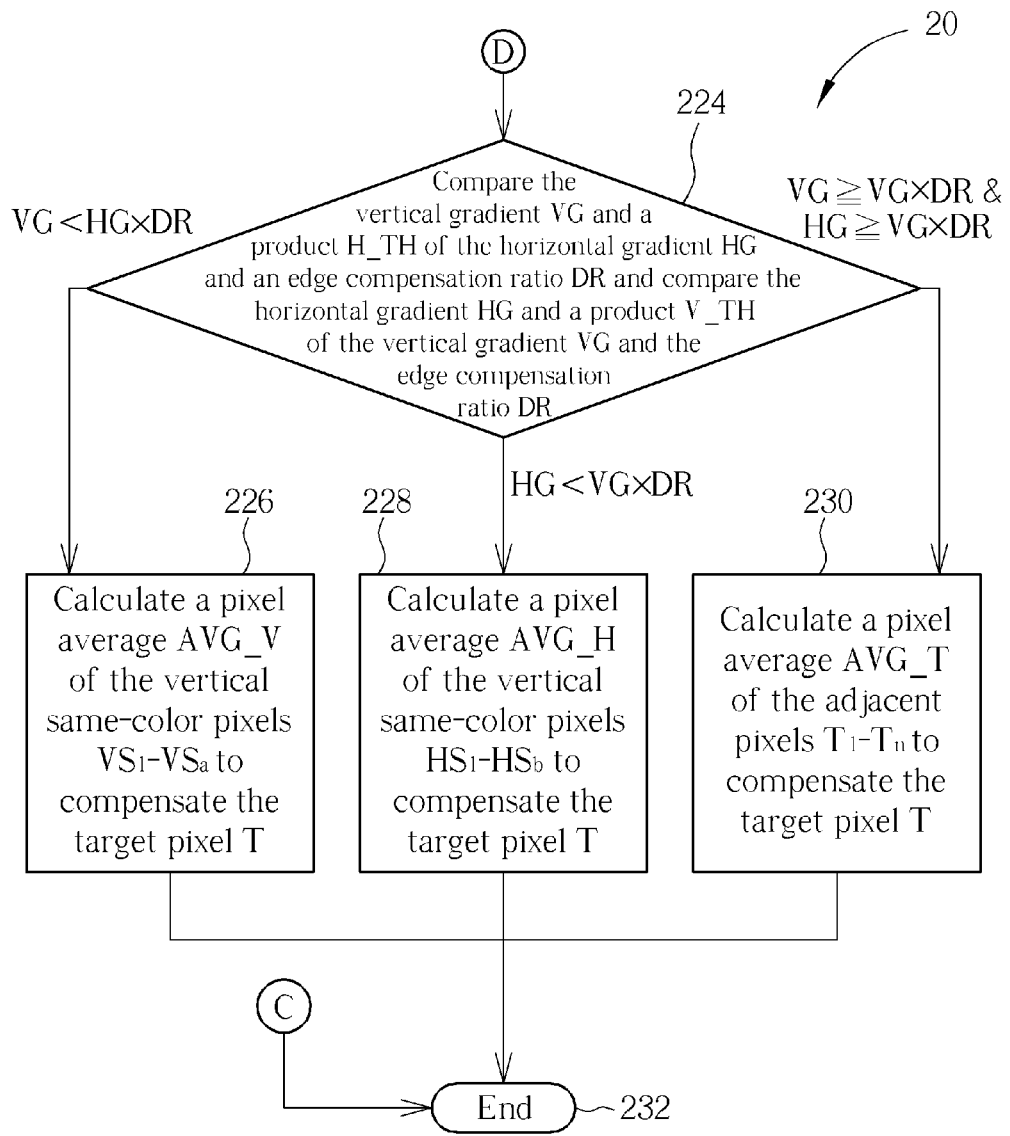

After the adaptive image processing method 10 determines whether the target pixel T is the defect pixel, the adaptive image processing method 10 can further perform a pixel operation for compensating the target pixel T. For an illustration of this procedure, please refer to FIGS. 2A~2C, which are schematic diagrams of an adaptive image processing method 20 according to an embodiment of the present invention. A difference between the adaptive image processing method 10 and the adaptive image processing method 20 is that the adaptive image processing method 20 increases pixel compensation procedures. As shown in FIGS. 2A~2C, the adaptive image processing method 20 comprises:

Step 200: Start;
Step 202: Receive an array image data comprising a plurality of pixels;
Step 204: Select a target pixel T from the plurality of pixels and defining a pixel zone Z according to a color corresponding to the target pixel T;
Step 206: Select adjacent pixels T1-Tn, which correspond to the same color with the target pixel T;
Step 208: Acquire a defect pixel threshold value DPC_TH by calculating a product of a sum dN of absolute differences between adjacent pixels $T_1$-$T_n$ and a defect pixel compensation ratio DPC;
Step 210: Acquire an adjacent difference value DIFF by calculating a sum dC of absolute differences between the target pixel T and each pixel of the adjacent pixels T1-Tn;
Step 212: Compare the defect pixel threshold value DPC_TH with the adjacent difference value DIFF to determine whether the target pixel is a defect pixel. Step 214 will be executed when the target pixel T is not the defect pixel; otherwise, step 216 will be executed;
Step 214: Maintain a pixel value of the target pixel T;
Step 216: Select vertical pixels $V_1$-$V_j$ which are at the same column of the target pixel T. The vertical $V_1$-$V_j$ comprises vertical same-color pixels $VS_1$-$VS_a$ which correspond to the color corresponding to the target pixel T;

Step 218: Acquire a vertical gradient VG by calculating a sum dV of absolute differences between pixels corresponding to the same color among the vertical pixels $V_1$–$V_j$;

Step 220: Select horizontal pixels $H_1$–$H_k$ which are at the same column of the target pixel T. The horizontal $H_1$–$H_k$ comprises vertical same-color pixels $HS_1$–$HS_b$ which correspond to the color corresponding to the target pixel T;

Step 222: Acquire a horizontal gradient HG by calculating a sum dH of absolute differences between pixels corresponding to the same color among the vertical pixels $H_1$–$H_k$;

Step 224: Compare the vertical gradient VG with a product H_TH of the horizontal gradient HG and an edge compensation ratio DR and executing a step 226 when the vertical VG is smaller than the product H_TH, compare the horizontal gradient HG with a product V_TH of the vertical gradient VG and the edge compensation ratio DR and execute step 228 when the horizontal gradient HG is smaller than the product V_TH, and execute step 230 when the vertical VG is greater than or equal to the product H_TH and the horizontal gradient HG is greater than or equal to the product V_TH;

Step 226: Calculate a pixel average AVG_V of the vertical same-color pixels $VS_1$–$VS_a$ to compensate the target pixel T;

Step 228: Calculate a pixel average AVG_H of the vertical same-color pixels $HS_1$–$HS_b$ to compensate the target pixel T;

Step 230: Calculate a pixel average AVG_T of the adjacent pixels T1–Tn to compensate the target pixel T;

Step 232: End.

The detailed description of the steps of the adaptive image processing method 20 is as follows. Please refer to FIG. 2A; the operation method of the steps 202-212 in the adaptive image processing method 20 is similar to that of the steps 102-112 in the adaptive image processing method 10, and are therefore not described herein for brevity. Different from the adaptive image processing method 10, the adaptive image processing method 20 decides whether to execute the pixel operation to compensate the target pixel T according to the determination result of the step 212. When the target pixel T is not the defect pixel, the step 214 is executed for keeping the pixel value of the target pixel T. When the target pixel T is the defect pixel, the step 216 is executed for compensating the target pixel T.

Please refer to FIG. 2B: the steps 216-218 are executed for acquiring the vertical gradient VG, and the steps 220-222 are executed for acquiring the horizontal gradient HG. However, the sequence of the steps 216-218 and the steps 220-222 is exchangeable or they can be simultaneously executed. In the steps 216-218, the vertical gradient VG is acquired by selecting the vertical pixels $V_1$–$V_j$ which are located in the same row as the target pixel T and calculating absolute differences between pixels corresponding to the same color of the vertical pixels $V_1$–$V_j$. Since the gradient generally represents the edge characteristics of objects in the image, the gradient is greater when pixel values heavily vary in one direction. Thus, the vertical gradient VG represents pixel value variation in the vertical direction of the target pixel T. Similarly, in the steps 220-222, the horizontal gradient HG is acquired by selecting the horizontal pixels $H_1$–$H_k$ which are located in the same column as the target pixel T and calculating absolute differences between pixels corresponding to the same color of the vertical pixels $H_1$–$H_k$. The detailed processes of the steps 216-222 will be explained with reference to FIG. 3 and FIG. 4.

Please refer to FIG. 2C. In step 224, whether the target pixel T is located at the edge of the objects in the image is determined according to the vertical gradient VG, the horizontal gradient HG and the edge compensation ratio DR. Different compensation values are calculated along different directions for accordingly compensating the target pixel T, to keep details and edge information of the image. When the vertical gradient VG is smaller than the product H_TH of the horizontal gradient HG and the edge compensation ratio DR (VG<HG×DR), the pixel values heavily vary in the horizontal direction of the target pixel T. Step 226 is executed for compensating the target pixel T in the vertical direction. When the horizontal gradient HG is smaller than the product V_TH of the vertical gradient VG and the edge compensation ratio DR (HG<VG×DR), the pixel values heavily vary in the vertical direction of the target pixel T. Step 228 is executed for compensating the target pixel T in the horizontal direction. When the above two conditions are not established, i.e. when the vertical gradient VG is greater than or equal to the product H_TH and the horizontal gradient HG is greater than or equal to the product V_TH, the pixel values vary similarly in the vertical direction and the horizontal direction of the target pixel T. Under this condition, step 230 can be executed for using the adjacent pixels $T_1$–$T_n$ to compensate the target pixel T.

The steps 226-230 calculate corresponding compensation values to compensate the target pixel T according to the determination result of step 224. In step 226, the average AVG_V of the vertical same-color pixels $VS_1$–$VS_a$ which correspond to the color of the target pixel T is calculated for compensating the target pixel T after determining the pixel values in the horizontal direction heavily vary. In step 228, the average AVG_H of the horizontal same-color pixels $HS_1$–$HS_b$ which correspond to the color of the target pixel T is calculated to compensate the target pixel T after determining the pixel values in the vertical direction heavily vary. In step 230, the average AVG_T of the adjacent pixels $T_1$–$T_n$ is calculated for compensating the target pixel T after determining the pixel values in the horizontal direction and the vertical direction gently vary. As a result, the adaptive image processing method 20 decides how to compensate the target pixel T according to the vertical gradient of the target pixel T (i.e. the vertical gradient VG), the horizontal gradient of the target pixel T (i.e. the horizontal gradient HG) and the edge compensation ratio DR when the target pixel T is the defect pixel, such that the detail and the edge characteristics of the image can be kept.

Figure 3:
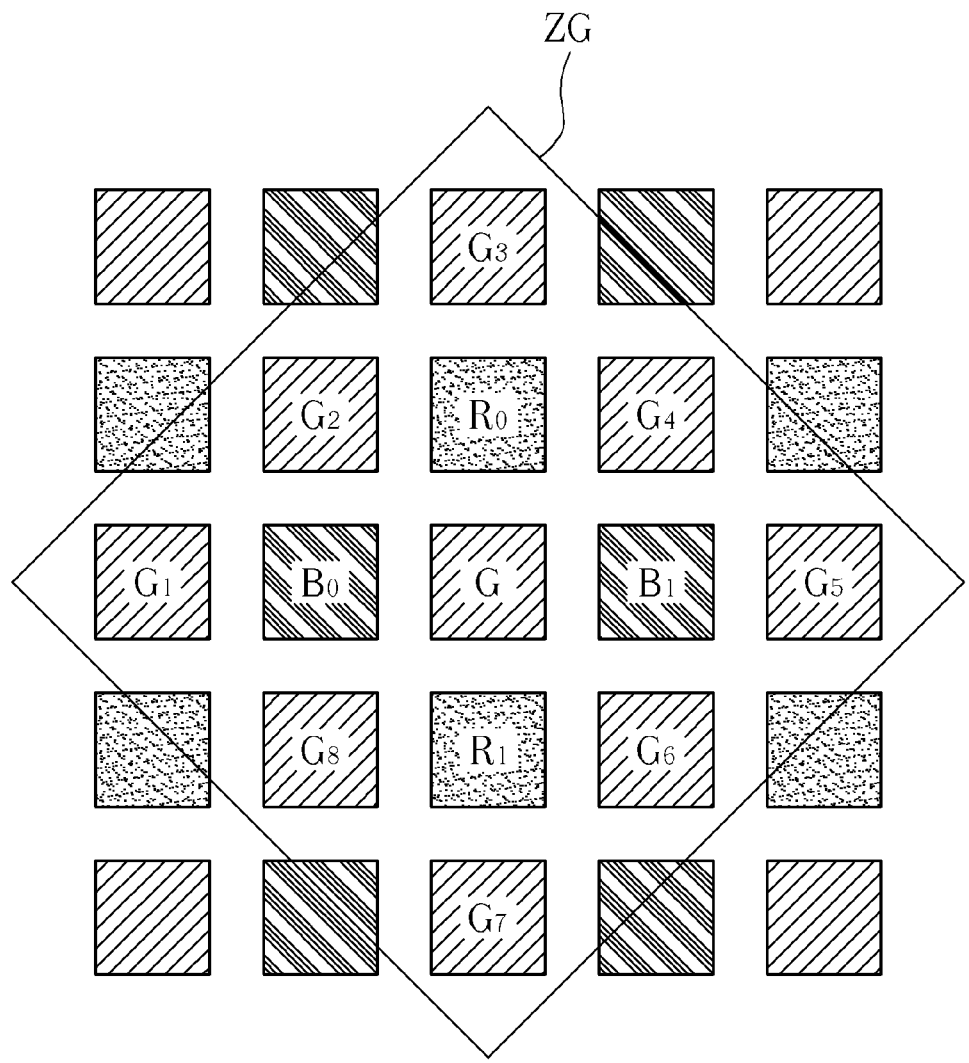
FIG. 3 is a schematic diagram of a pixel zone according to an embodiment of the present invention.

For example, a pixel zone ZG is defined in step 204 when the target pixel T is a pixel G corresponding to green. Please refer to FIG. 3, which is a schematic diagram of the pixel zone ZG. Since the target pixel T is the pixel G corresponds to green, the shape of the pixel zone ZG is preferably a diamond. As shown in FIG. 3, the pixel zone ZG includes pixels G, $G_1$–$G_8$, $R_0$, $R_1$, $B_0$ and $B_1$. The pixels G and $G_1$–$G_8$ correspond to green. The pixels $R_0$ and $R_1$ correspond to red. The pixels $B_0$ and $B_1$ correspond to blue. In step 206, the pixels $G_1$–$G_8$ are selected to be the adjacent pixels $T_1$–$T_n$. In step 208, the sum dN of the absolute differences between the pixels $G_1$–$G_8$ (i.e. adjacent pixels $T_1$–$T_n$) can be expressed as:

$$dN=|G_1-G_2|+|G_2-G_3|+|G_3-G_4|+|G_4-G_5|+|G_5-G_6|+ |G_6-G_7|+|G_7-G_8|+|G_8-G_1| \quad (4)$$

The defect pixel threshold value DPC_TH is the product of the sum dN and the defect pixel compensation ratio DPC. Thus, the defect pixel threshold value DPC_TH can be expressed as:

$$DPC\_TH=dN \times DPC \quad (5)$$

Similarly, according to the step 210, the adjacent difference value DIFF can be expressed as:

$$DIFF=|G-G_1|+|G-G_2|+|G-G_3|+|G-G_4|+|G-G_5|+|G-G_6|+|G-G_7|+|G-G_8| \quad (6)$$

After acquiring the defect pixel threshold value DPC_TH and the adjacent difference value DIFF, whether the target pixel T is the defect pixel is determined by comparing the defect pixel threshold value DPC_TH with the adjacent difference value DIFF. When the adjacent difference value DIFF is smaller than or equal to the defect pixel threshold value DPC_TH, the pixel G is not the defect pixel. When the adjacent difference value DIFF is greater than the defect pixel threshold value DPC_TH, the pixel G is the defect pixel.

Next, the procedure of compensating the pixel can be executed. When the pixel G is not the defect pixel, step 214 is executed for keeping the pixel value of the pixel G, whereas the steps 216-230 are executed for appropriately compensating the pixel G.

Please refer to FIG. 3. The vertical gradient VG and the horizontal gradient HG are calculated in the steps 216-220, wherein the vertical pixels $V_1$–$V_j$ are the pixels $G_3$, $G_7$, $R_0$, $R_1$ and the horizontal pixels $H_1$–$H_k$ are the pixels $G_1$, $G_5$, $B_0$, $B_1$. Thus the vertical gradient VG and the horizontal gradient HG can be separately expressed as:

$$VG = |G_3 - G_7| + |R_0 - R_1| \quad (7)$$

$$HG = |G_1 - G_5| + |B_0 - B_1| \quad (8)$$

After acquiring the vertical gradient VG and the horizontal gradient HG, the vertical gradient VG is compared with the product H_TH of the horizontal gradient HG and the edge compensation ratio DR in the step 222. When the vertical gradient VG is smaller than the product H_TH (VG<HG× DR), step 226 is executed for acquiring the pixel average AVG_V to compensate the pixel G. The vertical same-color pixels in the pixel zone ZG are the pixels $G_3$, $G_7$. Thus the pixel average AVG_V can be expressed as:

$$AVG\_V = \frac{(G_3 + G_7)}{2} \quad (9)$$

When the vertical gradient VG is greater than or equal to the product H_TH, the horizontal gradient HG is compared with the product V_TH of the vertical gradient VG and the edge compensation ratio DR. When the horizontal gradient HG is smaller than the product V_TH (HG<VG×DR), step 228 is executed for acquiring the average AVG_H to compensate the pixel G. The horizontal same-color pixels in the pixel zone ZG are the pixels $G_1$, $G_5$. Thus, the average AVG_H can be expressed as:

$$AVG\_H = \frac{(G_1 + S_5)}{2} \quad (10)$$

Finally, when the vertical gradient VG is greater than or equal to the product V_TH and the horizontal gradient HG is greater than or equal to the product H_TH (VG≥HG×DR & HG≥VG×DR), step 230 is executed for acquiring the average AVG_T to compensate the pixel G. The average AVG_T can be expressed as:

$$AVG\_T = \frac{(G_1 + G_2 + G_3 + G_4 + G_5 + G_6 + G_7 + G_8)}{8} \quad (11)$$

Figure 4:
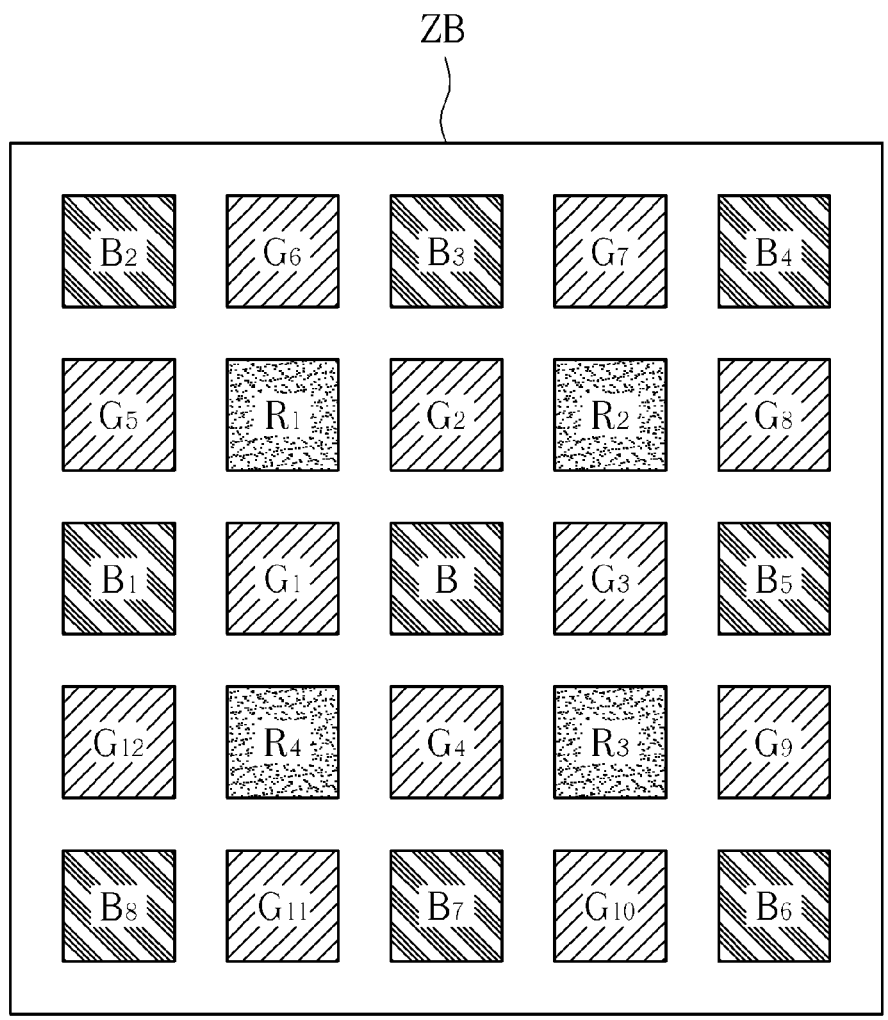
FIG. 4 is another schematic diagram of a pixel zone according to an embodiment of the present invention.

In another embodiment, the target pixel T also can be a pixel B corresponding to blue. According to the step 204, a pixel zone ZB can be defined. Please refer to FIG. 4, which is a schematic diagram of the pixel zone ZB according to an embodiment of the present invention. Since the pixels corresponding to blue are fewer in a Bayer image, the pixel zone ZB is preferably bigger than the pixel zone ZG when the target pixel T is the pixel B corresponding to blue, for acquiring enough adjacent pixels to accurately determine whether the target pixel T is the defect pixel. As shown in FIG. 4, since the target pixels T corresponds to blue, the pixel zone ZB is preferably a square, which contains pixels B, $B_1$–$B_8$ corresponding to blue, pixels $G_1$–$G_{12}$ corresponding to green and pixels $R_1$–$R_4$ corresponding to red. Note that, although the pixel zone ZB contains more pixels than the pixel zone ZG, the number of pixels for acquiring the defect pixel threshold value DPC_TH, the adjacent difference value DIFF, the vertical gradient VG and the horizontal gradient HG can be the same. The pixels $B_1$–$B_8$ correspond to the adjacent pixels $T_1$–$T_n$. The pixels $B_3$, $B_7$, $G_1$, $G_3$ correspond to the vertical pixels $V_1$–$V_j$. The pixels $B_1$, $B_5$, $G_2$, $G_4$ correspond to the horizontal pixels $H_1$–$H_k$. When the target pixel T corresponds to blue, the detailed operations of the adaptive image processing method 20 can be known by referring to the above descriptions, and are therefore not described herein for brevity. In addition, since the arranging method of the pixels corresponding to red and that of the pixels corresponding to blue are the same in the Bayer image, the detailed operations of the adaptive image processing method 20 can be known by referring to the above descriptions when the pixels correspond to red, and are therefore not described herein for brevity.

Noticeably, the spirit of the above embodiments of the present invention is to calculate the product of the sum of variations between same-color pixels adjacent to the target pixel and a defect pixel compensation ratio, for acquiring a defect pixel threshold value varied according to the target pixel. The above embodiments of the present invention compare the sum of the variations between the adjacent same-color pixels (i.e. the adjacent difference value DIFF) with the defect pixel threshold value to determine whether the target pixel is the defect pixel. In other words, the above embodiments of the present invention determine whether the relationship between the target pixel and the adjacent same-color pixels is different from the relationship between the adjacent same-color pixels, so as to determine whether the target pixel is the defect pixel. According to different applications, those skilled in the art can make appropriate modifications and alterations. For example, the pixel zone can be enlarged to acquire more adjacent pixels $T_1$–$T_n$, vertical pixels $V_1$–$V_j$ and the horizontal pixels $H_1$–$H_k$, such that the accuracy of the determination and the compensation can be improved.

In addition, the array image data received in step 202 of the adaptive image processing method 20 may be a full-color image. When the array image data is the full-color image, the detailed operation of the adaptive image processing method 20 is similar to that of the adaptive image processing method 20 when the array image data is the Bayer image. However, since the full-color image is the image generated by color interpolating the Bayer image, each pixel of the full color image contains more image details. In other words, when the target pixel T is the defect pixel, the adaptive image processing method 20 can use fewer pixels to acquire the vertical gradient VG and the horizontal gradient HG of the target pixel T and accordingly compensate the target pixel T.

Figure 5:
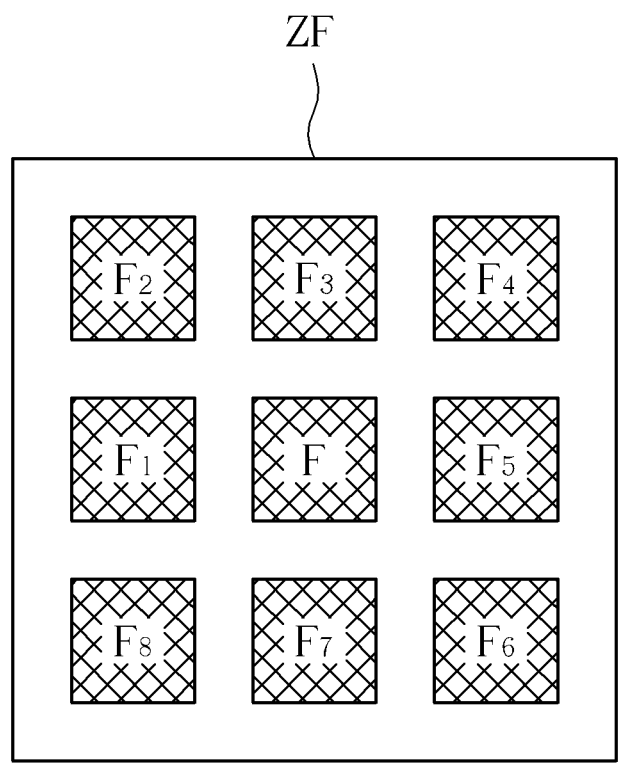
FIG. 5 is another schematic diagram of a pixel zone according to an embodiment of the present invention.

For example, a pixel zone ZF is defined when the array image data is received in step 202 of the adaptive image processing method 20. Please refer to FIG. 5, which is a schematic diagram of the pixel zone ZF. As shown in FIG. 5, the pixel zone ZF is preferably a square comprising a pixel F and pixels $F_1$–$F_8$, wherein the pixel F corresponds to the target pixel T, the pixels $F_1$–$F_8$ correspond to the adjacent pixels $T_1$–$T_n$, the pixels $F_3$, $F_7$ correspond to the vertical pixels $V_1$–$V_j$, and the pixels $F_1$, $F_5$ correspond to the horizontal pixels $H_1$–$H_k$. Different from the operations when the array image data is the Bayer image, the number of the vertical pixels $V_1$–$V_j$, which are used for acquiring the vertical gradient VG, and the number of the horizontal pixels $H_1$–$H_k$, which are used for acquiring the horizontal gradient, are both decreased. The formulas of calculating the vertical gradient VG and calculating the horizontal gradient HG are therefore modified to:

$$VG=|F_3-F_7| \qquad (12)$$

$$HG=|F_1-F_5| \qquad (13)$$

The formulas of calculating the average AVG_V and the average AVG_H are:

$$AVG\_V = \frac{(F_3 + F_7)}{2} \qquad (14)$$

$$AVG\_H = \frac{(F_1 + F_5)}{2} \qquad (15)$$

As a result, the adaptive image processing method 20 can detect and compensate the defect pixels in the full-color image.

For implementation of the adaptive image processing method, those skilled in the art can implement the adaptive image processing method 20 via software or hardware. For example, the adaptive image processing method 20 can be implemented in a computer product including a memory. The memory can be any data storage device, such as a read-only memory (ROM), for storing data which contain a program code compiled from the adaptive image processing method 20. The program code can be read and executed by a processor, to execute and achieve the steps of the adaptive image processing method 20.

Figure 6:
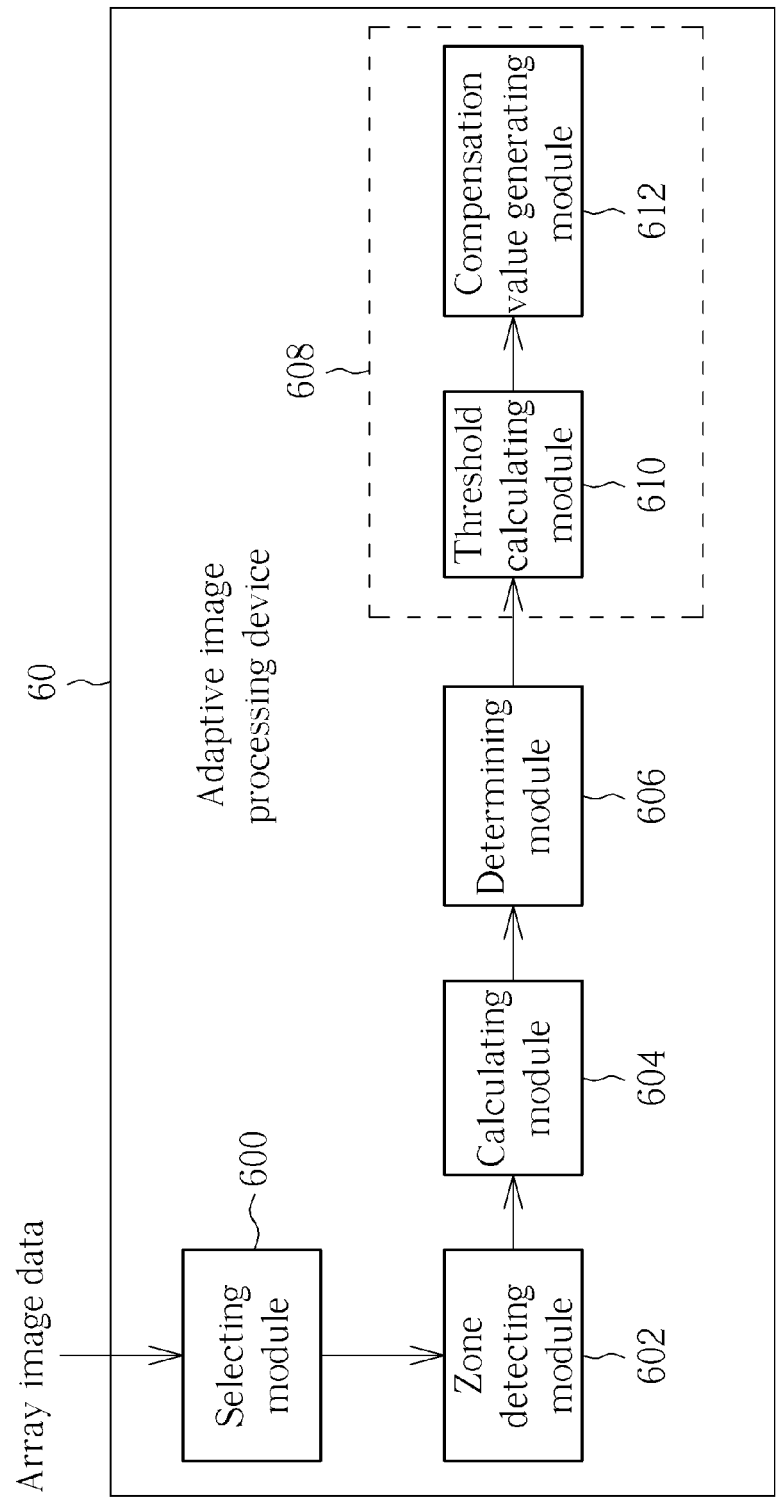
FIG. 6 is a schematic diagram of an adaptive image processing device according to an embodiment of the present invention.

Alternatively, please refer to FIG. 6, which is a schematic diagram of an adaptive image processing device 60. The adaptive image processing device 60 comprises a selecting module 600, a zone detecting module 602, a calculating module 604, a determining module 606 and a compensation module 608. The selecting module 600 is utilized for receiving an array image data containing a plurality of pixels and selecting a target pixel T. The array image data can be a Bayer image or a full-color image. The zone detecting module 602 is utilized for defining a pixel zone Z containing the target pixel T according to the color corresponding to the target pixel T. The calculating module 604 is utilized for calculating a product of the defect pixel compensation ratio DPC and a sum dN of absolute differences between adjacent pixels $T_1$–$T_n$, which are adjacent to the target pixel T and correspond to a same color as the target pixel T, to acquire the defect pixel threshold value DPC_TH; and for calculating a sum of absolute difference between the target pixel T and the adjacent pixel $T_1$–$T_n$, to acquire the adjacent difference value DIFF. The detecting module 606 is utilized for comparing the defect pixel threshold value DPC_TH with the adjacent difference value DIFF, to determine whether the target pixel T is the defect pixel. The compensation module 608 comprises a threshold value calculating module 610 and compensation value generating module 612, for keeping the pixel value of the target pixel T when the target pixel T is not the defect pixel; and using the compensation value generating module 612 for calculating the vertical gradient VG and the horizontal gradient HG of the target pixel T and generating an appropriate compensation value to compensating the target pixel T according to the vertical gradient VG, the horizontal gradient HG and the edge compensation value DR. As a result, the adaptive image processing method 20 can be implemented via the adaptive image processing device 60.

Figure 7:
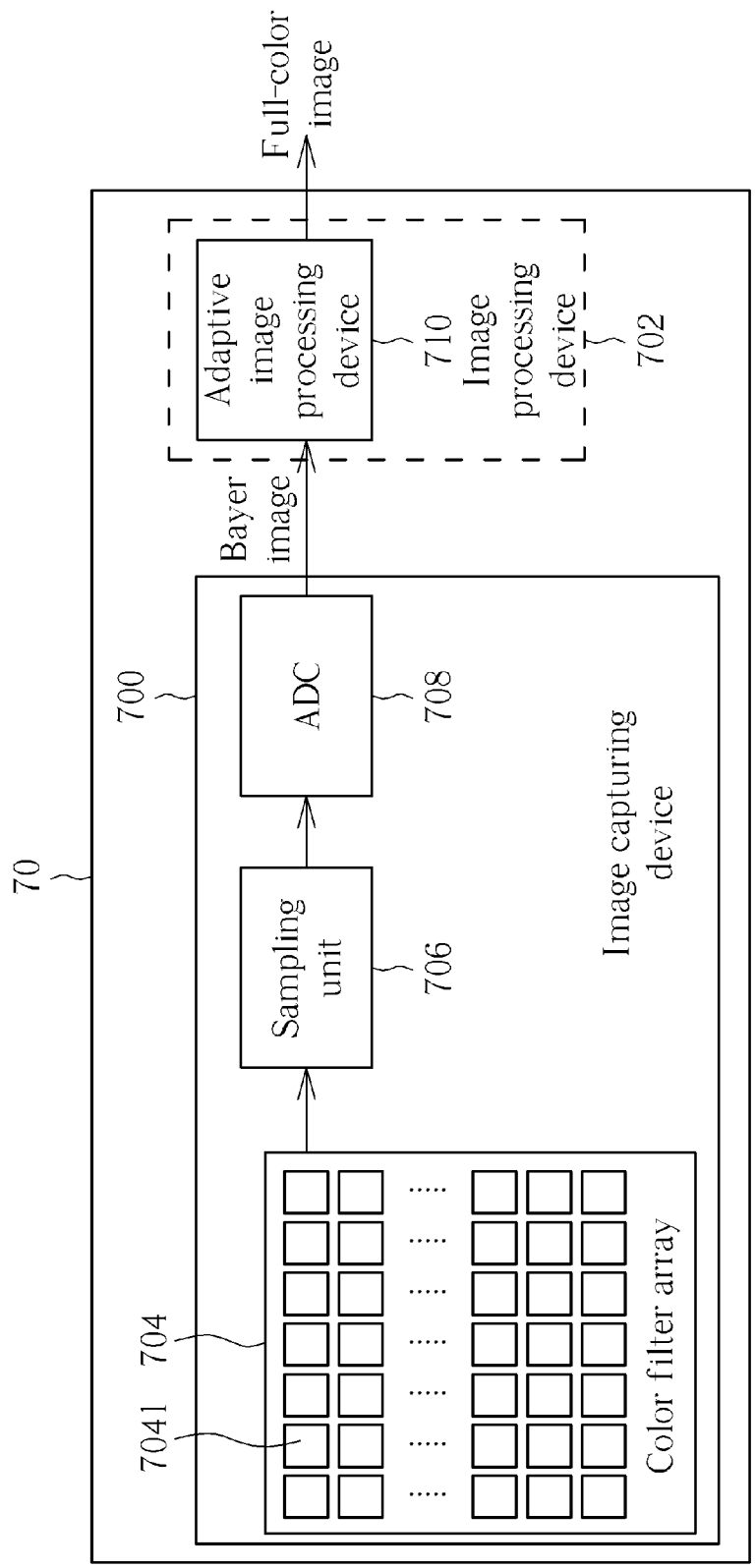
FIG. 7 is a schematic diagram of an image processing system according to an embodiment of the present invention.

The adaptive image processing method 20 and/or the adaptive image processing device 60 can be designed in an image processing system 70. Please refer to FIG. 7, which is a schematic diagram of the image processing system 70 according to an embodiment of the present invention. As shown in FIG. 7, the image processing system 70 comprises an image capturing device 700 and an image processing device 702. The image capturing device 700 comprises an image sensor 704, such as a CMOS image sensor (CIS) or a Charge-Coupled Device (CCD), a sampling unit 706 and an analog-to-digital converter (ADC) 708. The image sensor 704 is utilized for capturing an image. The image sensor 704 comprises a color filter array (CFA), such as a Bayer CFA, for generating a pixel array of the image, wherein each pixel of the pixel array corresponds to a color filter 7041, so as to correspond to one of a plurality of colors, such as red, blue and green. The pixel array is outputted to the image processing device 702 after sampling is performed by the sampling unit 706 and processing is performed by the ADC 708. The image processing device 702 comprises an adaptive image processing device 710 and is utilized for receiving the pixel array (i.e. the Bayer image) generated by the image capturing device 700 and outputting a full-color image after executing specific image procedures on the pixel array, such as defect pixel compensation, color interpolation and image enhancement.

To sum up, the above embodiments determine whether the relationship between the target pixel and the adjacent same-color pixels is different from the relationship between the adjacent same-color pixels via comparing the defect pixel threshold value with the adjacent difference value, to determine whether the target pixel is the defect pixel. The product of absolute differences between the adjacent same-color pixels and the defect compensation ratio can be the defect pixel threshold value, and the defect compensation ratio can be changed according to the photosensitivity. Thus, the above embodiments can prevent erroneous determinations due to the pixel value of the target pixel, and can further adjust the defect pixel threshold value according to the photosensitivity, to effectively increase accuracy of determination. In addition, the above embodiments can omit the step of reading defect pixel information from the memory to adaptively detect and compensate the defect pixel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An adaptive image processing method, comprising:
   defining a pixel zone involving a target pixel according to a color corresponding to the target pixel;
   selecting a plurality of adjacent pixels from the pixel zone, wherein the adjacent pixels and the target pixel correspond to the same color;
   acquiring a defect pixel threshold value by calculating a product of a sum of absolute differences between each pixel of the plurality of adjacent pixels and a defected pixel compensation ratio;

acquiring an adjacent difference value by calculating a sum of absolute differences between the target pixel and each pixel of the plurality of adjacent pixels; and determining whether the target pixel is a defect pixel by comparing the defect pixel threshold value with the adjacent difference value.

2. The adaptive image processing method of claim 1, wherein the defect pixel compensation ratio is determined according to a photosensitivity utilized in an image sensor for capturing an image.

3. The adaptive image processing method of claim 2, wherein the defect pixel compensation ratio is inversely proportional to the photosensitivity.

4. The adaptive image processing method of claim 1, wherein the step of determining whether the target pixel is a defect pixel by comparing the defect pixel threshold value with the adjacent difference value comprises:

determining the target pixel is a normal pixel when the adjacent difference value is smaller than or equal to the defect pixel threshold value.

5. The adaptive image processing method of claim 4, further comprising:

keeping a pixel value of the target pixel when determining the target pixel is the normal pixel.

6. The adaptive image processing method of claim 1, wherein the step of determining whether the target pixel is a defect pixel by comparing the defect pixel threshold value and the adjacent difference value comprises:

determining the target pixel is the defect pixel when the adjacent difference value is greater than the defect pixel threshold value.

7. The adaptive image processing method of claim 6, further comprising:

executing a pixel operation to compensate the target pixel when determining the target pixel is the defect pixel.

8. The adaptive image processing method of claim 7, wherein the step of executing a pixel operation when determining the target pixel is the defect pixel to compensate the target pixel comprises:

selecting a plurality of vertical pixels located at the same row of the target pixel which comprise a plurality of vertical same-color pixels, wherein the vertical same-color pixels and the target pixel correspond to the same color;

acquiring a vertical gradient by calculating a sum of absolute differences between pixels corresponding to the same color of the plurality of vertical pixels;

selecting a plurality horizontal pixels located at the same column of the target pixel which comprise a plurality of horizontal same-color pixels, wherein the horizontal same-color pixels and the target pixel correspond to the same color;

acquiring a horizontal gradient by calculating a sum of absolute differences between pixels corresponding to the same color of the plurality of horizontal pixels; and compensating the target pixel according to the vertical gradient, the horizontal gradient and an edge compensation ratio.

9. The adaptive image processing method of claim 8, wherein the step of compensating the target pixel according to the vertical gradient, the horizontal gradient and an edge compensation ratio comprises:

comparing the vertical gradient with a product of the edge compensation ratio and the horizontal gradient; and compensating the target pixel with an average pixel value of the plurality of vertical same-color pixels when the vertical gradient is smaller than the product of the edge compensation ratio and the horizontal gradient.

10. The adaptive image processing method of claim 8, wherein the step of compensating the target pixel according to the vertical gradient, the horizontal gradient and an edge compensation ratio comprises:

comparing the horizontal gradient with a product of the edge compensation ratio and the vertical gradient; and compensating the target pixel with an average pixel value of the plurality of horizontal same-color pixels when the horizontal gradient is smaller than the product of the edge compensation ratio and the vertical gradient.

11. The adaptive image processing method of claim 8, wherein the step of compensating the target pixel according to the vertical gradient, the horizontal gradient and an edge compensation ratio comprises:

comparing the vertical gradient with a product of the edge compensation ratio and the horizontal gradient;

comparing the horizontal gradient with a product of the edge compensation ratio and the vertical gradient; and compensating the target pixel with an average pixel value of the plurality of adjacent pixels when the vertical gradient is greater than or equal to the product of the edge compensation ratio and the horizontal gradient and the horizontal gradient is greater than or equal to the product of the edge compensation ratio and the vertical gradient.

12. The adaptive image processing method of claim 8, wherein the step of compensating the target pixel according to the vertical gradient, the horizontal gradient and an edge compensation ratio comprises:

acquiring a first comparison result by comparing the vertical gradient with a product of the edge compensation ratio and the horizontal gradient;

acquiring a second comparison result by comparing the horizontal gradient with a product of the edge compensation ratio and the vertical gradient; and compensating the target pixel with an average pixel value of the plurality of vertical same-color pixels, an average pixel value of the plurality of horizontal same-color pixels, or an average pixel value of the plurality of adjacent pixels according to the first comparison result and the second comparison result.

13. The adaptive image processing method of claim 1, wherein the image is a Bayer image generated by a Bayer color filter array.

14. The adaptive image processing method of claim 13, wherein the pixel zone is a square when the color corresponding to the target pixel is red or blue.

15. The adaptive image processing method of claim 13, wherein the pixel zone is a diamond when the color corresponding to the target pixel is green.

16. The adaptive image processing method of claim 1, wherein the image is a full-color image generated through color interpolation.

17. The adaptive image processing method of claim 13, wherein the pixel zone is a square when the image is a full color image.

18. A non-transitory computer readable recording media, comprising a plurality of instructions for allowing a processor to execute the adaptive image processing method of claim 1.

19. An adaptive image processing device, for processing an image which comprises a plurality of pixels, each pixel of the plurality of pixels corresponding to a color, the adaptive image processing device comprising:

a zone detecting module, for defining a pixel zone involving a target pixel according to a color corresponding to the target cell;

a calculation module, for acquiring a defect pixel threshold value by calculating a product of a sum of absolute differences between each pixel of a plurality of adjacent pixels and a defected pixel compensation ratio, and acquiring an adjacent difference value by calculating a sum of absolute differences between the target pixel and each pixel of the plurality of adjacent pixels; and a determination module, for determining whether the target pixel is a defect pixel according to the defect pixel threshold value and the adjacent difference value;

wherein the adjacent pixels and the target pixel correspond to the same color.

20. The adaptive image processing device of claim 19, wherein the defect pixel compensation ratio is determined according to a photosensitivity utilized in an image sensor for capturing an image.

21. The adaptive image processing device of claim 20, wherein the defect pixel compensation ratio is inversely proportional to the photosensitivity.

22. The adaptive image processing device of claim 19, wherein the determination module determines the target pixel is a normal pixel when the adjacent difference value is smaller than or equal to the defect pixel threshold value; otherwise the determination module determines the target pixel is the defect pixel.

23. The adaptive image processing device of claim 19, further comprising:

a compensation module for keeping a pixel value of the target pixel when the determination module determines the target pixel is the normal pixel and executing a pixel operation to compensate the pixel when the determination module determines the target pixel is the defect pixel.

24. The adaptive image processing device of claim 23, wherein the compensation module comprises:

a threshold value calculation module, for acquiring a vertical gradient by calculating a sum of absolute differences between pixels corresponding to the same color of a plurality of vertical pixels and acquiring a horizontal gradient by calculating a sum of absolute differences between pixels corresponding to the same color of a plurality of horizontal pixels, wherein the vertical pixels are located at the same row of the target pixel and the horizontal pixels are located at the same column of the target pixel; and a compensation value generating module, for generating a compensation value to compensate a pixel value of the target pixel according to the vertical gradient, the horizontal gradient and an edge compensation ratio.

25. The adaptive image processing device of claim 24, wherein the compensation generating module acquires the compensation value by calculating an average pixel value of pixels which correspond to the same color of the target pixel of the plurality of vertical pixels when the vertical gradient is smaller than the product of the edge compensation ratio and the horizontal gradient.

26. The adaptive image processing device of claim 24, wherein the compensation generating module acquires the compensation value by calculating an average pixel value of pixels corresponding to the same color of the target pixel of the plurality of horizontal pixels when the horizontal gradient is smaller than the product of the edge compensation ratio and the vertical gradient.

27. The adaptive image processing device of claim 24, wherein the compensation generating module acquires the compensation value by calculating an average of the plurality of adjacent pixels when the vertical gradient is greater than or equal to the product of the edge compensation ratio and the horizontal gradient and the horizontal gradient is greater than or equal to the product of the edge compensation ratio and the vertical gradient.

28. The adaptive image processing device of claim 19, wherein the image is a Bayer image generated by a Bayer color filter array.

29. The adaptive image processing device of claim 28, wherein the pixel zone is a square when the color corresponding to the target pixel corresponds is red or blue.

30. The adaptive image processing device of claim 28, wherein the pixel zone is a diamond when the color corresponding to the target pixel corresponds is green.

31. The adaptive image processing device of claim 19, wherein the image is a full-color image generated through color interpolation.

32. The adaptive image processing device of claim 31, wherein the pixel zone is a square when the image is the full color image.

33. An image processing system, comprising:

an image capturing device, comprising an image sensor for capturing an image which comprises a plurality of pixels, each pixel of the plurality of pixels corresponding to a color; and an image processing device, for receiving the image and executing at least one image procedure, comprising the adaptive image processing device of claim 19.

* * * * *